(12) United States Patent
Tyrrell, Jr. et al.

(10) Patent No.: US 10,776,742 B2
(45) Date of Patent: Sep. 15, 2020

(54) SYSTEMS AND METHODS FOR INTERACTING WITH A CLIENT DEVICE

(71) Applicant: Reflektive, Inc., San Francisco, CA (US)

(72) Inventors: James Wilson Tyrrell, Jr., San Francisco, CA (US); Rajeev Behera, San Francisco, CA (US); Erick Tai, San Francisco, CA (US)

(73) Assignee: REFLEKTIVE, INC., San Francisco, CA (US)

( * ) Notice: Subject to any disclaimer, the term of this patent is extended or adjusted under 35 U.S.C. 154(b) by 236 days.

(21) Appl. No.: 15/951,186

(22) Filed: Apr. 12, 2018

(65) Prior Publication Data

US 2018/0247251 A1    Aug. 30, 2018

Related U.S. Application Data

(63) Continuation-in-part of application No. 15/761,122, filed as application No. PCT/US2016/056691 on Oct. 12, 2016.

(60) Provisional application No. 62/484,420, filed on Apr. 12, 2017, provisional application No. 62/240,509, filed on Oct. 12, 2015.

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06Q 10/06 | (2012.01) |
| G06Q 10/10 | (2012.01) |
| G06F 9/445 | (2018.01) |
| G06F 16/958 | (2019.01) |

(52) U.S. Cl.
CPC ... G06Q 10/06398 (2013.01); G06F 9/44526 (2013.01); G06F 16/986 (2019.01); G06Q 10/1097 (2013.01); G06Q 10/107 (2013.01)

(58) Field of Classification Search
CPC .................................................. G06Q 10/06398
USPC ........................................................ 719/313
See application file for complete search history.

(56) References Cited

U.S. PATENT DOCUMENTS

| | | | |
|---|---|---|---|
| 8,713,438 B1 | 4/2014 | Broniek et al. | |
| 9,389,882 B2 | 7/2016 | Armstrong et al. | |
| 2004/0030697 A1 | 2/2004 | Cochran et al. | |
| 2004/0254832 A1 | 12/2004 | Harkin | |
| 2005/0027781 A1 | 2/2005 | Curry et al. | |
| 2007/0136692 A1 | 6/2007 | Seymour et al. | |

(Continued)

FOREIGN PATENT DOCUMENTS

JP    H10190720 A    7/1998

OTHER PUBLICATIONS

Communication pursuant to Rules 161(2) and 162 EPC received for European Patent Application No. 16856133.0 dated May 18, 2018, 3 pages.

(Continued)

*Primary Examiner* — Timothy A Mudrick
(74) *Attorney, Agent, or Firm* — EcoTech Law Group, P.C.

(57) ABSTRACT

Novel systems and methods for interacting with a client device are described. The network-based systems and methods of the present teachings are capable of seeking feedback regarding individual performance and seeking information relating to work deliverable, such as assigning individuals (Continued)

tasks, conveying a "to-do list," sharing an agenda between two or more users and managing goals of teams and/or individuals.

14 Claims, 13 Drawing Sheets

(56) References Cited

U.S. PATENT DOCUMENTS

| | | |
|---|---|---|
| 2011/0178981 A1 | 7/2011 | Bowen et al. |
| 2011/0246330 A1 | 10/2011 | Tikku et al. |
| 2013/0110505 A1 | 5/2013 | Gruber et al. |
| 2013/0304538 A1 | 11/2013 | Arad et al. |
| 2013/0339270 A1 | 12/2013 | Singh |
| 2015/0128021 A1 | 5/2015 | Hewett et al. |
| 2015/0180911 A1 | 6/2015 | Mavinakuli et al. |
| 2015/0379879 A1 | 12/2015 | Selkirk et al. |
| 2016/0171567 A1 | 6/2016 | Cohen et al. |

OTHER PUBLICATIONS

Extended European Search Report received for EP Application No. 16856133.0 dated Mar. 28, 2019, 15 pages.
Barreau et al., "ALERT mobile: Managing coastal archaeological heritage in Western France", ResearchGate, dated Nov. 2013, 5 pages.
"Web site, Feedback Server", retrieved from http://www.dataillusion.com/features.aspx, dated 2015, 3 pages.
"Web site, Email Auto Extractor", retrieved from https://chrome.google.com/webstore/detail/email-auto-extractor/blkpobilpealk-kcibgcgfmflneafkkah, dated 2016, 1 page.
International Search Report and Written Opinion for International Application No. PCT/US2016/056691 dated Jan. 24, 2017, 18 pages.

| Functions of the feedback plugin 900 | Exemplar code in Javascript and/or jQuery |
|---|---|
| 901<br><br>After feedback plugin is installed on a client device, the feedback plugin subscribes to be notified when one or more predefined web pages are visited.<br><br>For Chrome plugins, subscription occurs when the feedback plugin's manifest file is parsed at installation time. The relevant portion of such a manifest is provided as an example. | ```<br>{<br>  "content_scripts": [<br>    {<br>      "matches": [<br>        "https://mail.google.com/*",<br>        "https://inbox.google.com/*"<br>      ],<br>      "js": [<br>        "scripts/plugin.js"<br>      ],<br>      "run_at": "document_end"<br>    }<br>  ]<br>}<br>``` |
| 902<br><br>Feedback plugin, in its activated state, monitors new electronic mail and feedback plugin is activated by DOM changes that match selector EMAIL_SELECTOR | ```<br>function monitorEmails() {<br>  var EMAIL_SELECTOR = '#\\:2';<br><br>  monitorSelector(EMAIL_SELECTOR, function()<br>  {<br>    monitorSidebar();<br>  });<br>}<br>``` |
| 903<br><br>Feedback plugin monitors DOM changes to determine if there is a place to display the plugin's UI (In Gmail, the sidebar) | ```<br>function monitorSidebar() {<br>  var SIDEBAR_SELECTOR = 'td.y3 > .nH > .nH';<br><br>  monitorSelector(SIDEBAR_SELECTOR,<br>  function(sidebar) {<br>    attachPlugin(sidebar);<br>  });<br>}<br>``` |

FIG. 8

| | |
|---|---|
| 904<br>Feedback plugin displays at the appropriate location in Gmail, within the sidebar | Web Browser Embodiment<br><br>```<br>function attachPlugin(sidebar) {<br>  var iframe = $('<iframe/>');<br>  iframe.attr('src', 'https://www.reflektive.com/plugin');<br>  sidebar.prepend(iframe);<br>}<br>```<br><br>Outlook Mac Embodiment<br><br>```<br>- (void)alignToTargetWin:(AXUIElementRef)targetAXWin<br>withID:(CGWindowID)windowID<br>{<br>  pid_t pid;<br>  AXUIElementGetPid(targetAXWin, &pid);<br><br>  CFTypeRef positionRaw;<br>  AXError error = AXUIElementCopyAttributeValue(targetAXWin,<br>kAXPositionAttribute, &positionRaw);<br><br>  if (error != kAXErrorSuccess)<br>  {<br>    return;<br>  }<br><br>  CGPoint position;<br>  AXValueGetValue(positionRaw, kAXValueCGPointType,<br>&position);<br><br>  CFTypeRef sizeRaw;<br>  error = AXUIElementCopyAttributeValue(targetAXWin,<br>kAXSizeAttribute, &sizeRaw);<br><br>  if (error != kAXErrorSuccess)<br>  {<br>    return;<br>  }<br>``` |

FIG. 8 (contd.)

| | |
|---|---|
| 904<br>(contd) | CGSize size;<br>AXValueGetValue(sizeRaw, kAXValueCGSizeType, &size);<br><br>int screenHeight = [[[NSScreen screens] objectAtIndex:0] frame].size.height;<br>  NSRect frame = [self frame];<br>  frame.origin = CGPointMake(position.x + size.width, screenHeight - position.y - size.height + SIDEBAR_VERTICAL_MARGIN);<br>  frame.size = CGSizeMake(_idealWidth, size.height - SIDEBAR_VERTICAL_SHORTEN);<br><br>  if (_googleAuthIsExpanded)<br>  {<br>    frame.origin.x = frame.origin.x - SIDEBAR_GOOGLE_AUTH_WIDTH;<br>    [self orderWindow:NSWindowAbove relativeTo:windowID];<br>    [_googleAuthView setFrame:NSMakeRect(0, 0, SIDEBAR_GOOGLE_AUTH_WIDTH, _frame.size.height)];<br>  }<br>  else<br>  {<br>    [self orderWindow:NSWindowBelow relativeTo:windowID];<br>  }<br><br>  [self setFrame:frame display:YES animate:(_collapsed == NO)];<br><br>  NSLog(@"PulseWindow order window %u", windowID);<br><br>  [self wakeUpAfterOrdering];<br><br>  CFRelease(positionRaw);<br>  CFRelease(sizeRaw);<br>} |

FIG. 8 (contd.)

| | |
|---|---|
| 905<br>Feedback plugin analyzes specified electronic content to identify potential mention of one or more individuals in an active electronic mail on a client device | ```
function monitorMentions(iframe) {
  var MENTION_SELECTOR = '.gD';

monitorSelector(MENTION_SELECTOR,
function(elements) {
    var mentions =
parseMentionElements(elements);
    display(iframe, mentions);
  });
}
``` |
| 906<br>Feedback plugin conveys a list of potential mentions to the web server and displays results from the web server as a web page in an iframe | ```
function display(iframe, mentions) {
  var query = mentions.join(',');
  var url = 'https://www.reflektive.com/
plugin?mentions=' + query
  iframe.attr('src', url);
}
``` |

FIG. 8 (contd.)

| Function of feedback server 1000 | Exemplar code in Ruby, Rails |
|---|---|
| 1001<br><br>Register endpoint in the feedback server that responds to information conveyed from the feedback plugin. | FeedbackServer::Application.routes.draw do<br>  get '/plugin' => 'plugin#index'<br>end |
| 1002<br><br>Accept web requests from the feedback plugin | class PluginController < ApplicationController<br>  def index<br>    @users = parse_mentions<br>    render :index<br>  end<br>end |
| 1003<br><br>Parse mentions supplied by the feedback plugin | PARSE_REGEX = /[^, ]*\@[^, ]*/<br><br>def parse_mentions<br>  unparsed = params[:mentions]<br>  parsed = unparsed.scan(PARSE_REGEX)<br>  User.where(email: mentions)<br>end |

FIG. 9

SYSTEMS AND METHODS FOR INTERACTING WITH A CLIENT DEVICE

RELATED APPLICATIONS

This application claims priority to U.S. Provisional Patent Application No. 62/484,420 which was filed on Apr. 12, 2017 and is a continuation-in-part of U.S. application Ser. No. 15/761,122 filed on Mar. 19, 2018 which is a National Stage Application of PCT/US16/56691 filed on Oct. 12, 2016, which in turns claims priority to U.S. Provisional Patent Application No. 62/240,509 filed on Oct. 12, 2015 and each of these prior applications are incorporated by reference herein for all purposes.

FIELD

The present teachings generally relate to novel network-based systems and methods for interacting with a client device. More particularly, the present teachings relate to Internet-based systems and methods for—communication between a feedback plugin, which is installed on a client device and that is communicatively coupled to a feedback server to allow for such functions as seeking feedback regarding individual performance, assigning individuals tasks, conveying a "to-do list," sharing an agenda between two or more users and managing goals of teams and/or individuals.

BACKGROUND

Employee feedback is not only an integral part of personal and professional growth of an employee, but it also allows an employer to set goals and expectations for its employees, ultimately contributing to produce a successful workforce that is both productive and of high morale. Regardless of whether the feedback is intended for an employee, an employer or a third party, it is most effective when it is specific and timely. For a feedback to be specific it is effective when it relates to a particular job or task and for a feedback to be timely, it is effective when the job is complete or certain job milestones are complete.

Thus, there is a need to seek and obtain feedback that is both timely and specific.

SUMMARY

To this end, the present invention offers no systems and methods of interacting with a client device that allow for, among other things, obtaining timely and specific feedback. In exemplar preferred embodiments, the present arrangements and teachings offer Internet-based systems and methods for—communication between a feedback plugin, which is installed on a client device and that is communicatively coupled to a feedback server. These systems and methods allow seeking timely and specific information relating to work deliverables, such as providing information to facilitate assignment of individuals tasks, conveying a "to-do list," sharing information to facilitate setting an agenda between two or more users and managing goals of teams and/or individuals.

In one aspect, the present teachings provide methods of seeking feedback. One exemplar feedback seeking method includes: (1) receiving, at a feedback server from a feedback plugin, information relating to potential mention of one or more individuals to gain insight into whether identity of one or more of the individuals is present in an electronic content; (2) identifying one or more relevant individuals, if information relating to identity of one or more of the individuals is present in the information relating to potential mention of one or more of the individuals obtained from the receiving step of (1), and if one or more of the individuals are those that the feedback server determines the user to be qualified to provide feedback for; (3) collecting, using the feedback server, additional information about one or more of the relevant individuals to generate a user profile for each of one or more of the relevant individuals; (4) transmitting, from the feedback server to the feedback plugin, the user profile, which is more informative about one or more of the relevant individuals than the information relating to potential mention of one or more of the individuals that was received at the feedback server; and (5) displaying and/or causing to display, using the feedback server and/or the feedback plugin and on or adjacent to the electronic content on the client device, a user interface and/or a panel for obtaining feedback on at least some of the relevant individuals.

In the exemplar method described above, the user interface and/or the panel may be constructed using the user profile, and during the step of displaying and/or the causing to display, an electronic content provider may provide the specified electronic content. Further, in this configuration, the feedback server and/or the feedback plugin provide the user interface and/or the panel, and the feedback server is different from the electronic content provider.

Moreover, the information relating to potential mention of one or more of the individuals does not necessarily convey knowledge about one or more of the individuals. At the time when the electronic content is or was active on the client device, the feedback plugin is communicatively coupled to the client device (which is associated with a user). In this arrangement, the feedback server is communicatively coupled to the feedback plugin through a network.

In another aspect, the present teachings provide another type of feedback seeking method. One example of this type of method includes: (1) receiving a signal from a client device associated with a user that an electronic mail is active on the client device, and the electronic mail identifies a sender and one or more recipients of the electronic mail; (2) conveying information regarding the sender and one or more of the recipients to a feedback server; (3) identifying, using the feedback server and based on the information regarding the sender and one or more of the recipients, one or more relevant individuals that the user is qualified to provide feedback for and one or more of the relevant individuals include at least one of the sender and/or one or more of the recipients; and (4) displaying and/or causing to display, on the client device, a user interface or a panel for seeking feedback from the user regarding individual performance of the relevant individuals.

In yet another aspect, the present teachings provide another type of feedback seeking method. One example of this type of method includes: (1) receiving a notification at a feedback plugin that a specified electronic content is active on a client device (which is associated with a user), and the feedback plugin is communicatively coupled to the client device; (2) retrieving, using the feedback plugin and in response to the receiving of the notification, at least a portion of the specified electronic content from the client device into the feedback plugin; (3) analyzing, using the feedback plugin, at least the portion of the specified electronic content to identify information relating to potential mention of one or more individuals in the specified electronic content; (4) conveying the information relating to potential mention of one or more of the individuals from the feedback plugin to a feedback server to gain insight into whether the information relating to potential mention of one or more of the individuals in the specified content is related to one or more relevant individuals. In this method, one or more relevant individuals are those that the user is qualified to provide feedback for; (5) accepting from the feedback server the user profile for one or more of the relevant individuals; and (6) displaying and/or causing to display, using the feedback server and/or the feedback plugin and on or adjacent to the electronic content on the client device, a user interface and/or a panel for obtaining feedback on at least some of the relevant individuals. In this embodiment of the present teachings, the user interface and/or the panel is constructed using the user profile. Furthermore, in the displaying and/or the causing to display step, the web server provides the specified electronic content and the feedback server and/or the feedback plugin provides the user interface and/or the panel. In this configuration, the feedback server is different from the web server.

In yet another aspect, the present teachings provide another type feedback seeking method. One example of this type of method includes: (1) receiving a notification at a feedback plugin that a specified electronic content is active on a client device (which is associated with a user) and the feedback plugin is communicatively coupled to the client device; (2) retrieving, using the feedback plugin and in response to the receiving of the notification, at least a portion of the specified electronic content from the client device into the feedback plugin; (3) analyzing, using the feedback plugin, at least the portion of the specified electronic content to identify information relating to potential mention of one or more individuals in the specified electronic content; (4) conveying the information relating to potential mention of one or more of the individuals from the feedback plugin to a feedback server to gain insight into the information relating to potential mention of one or more of the individuals in the specified content; (5) identifying, using the feedback server, one or more relevant individuals based on the information relating to potential mention of one or more of the individuals identified in the analyzing step in (3); (6) collecting, using the feedback server, additional information about one or more of the relevant individuals to generate a user profile for each of one or more of the relevant individuals; (7) transmitting, from the feedback server to the feedback plugin, the user profile relating to at least some of the relevant individuals that the user is qualified to provide feedback for, and the user profile provided by the feedback server is more informative about one or more of the relevant individuals than the information relating to potential mention of one or more of the individuals; and (8) displaying and/or causing to display, using the feedback server and/or the feedback plugin and on or adjacent to the electronic content on the client device, a user interface and/or a panel for obtaining feedback on at least some of the relevant individuals. The user interface and/or the panel may be constructed using the user profile. In the displaying and/or the causing to display step of (8), the web server provides the specified electronic content and the feedback server and/or the feedback plugin provides the user interface and/or the panel. In this configuration, the feedback server is different from the web server.

In yet another aspect, the present arrangements provide systems for seeking feedback. The system includes: (1) a feedback server containing instructions for providing feedback and/or work deliverables to the client device; (2) a network serving as a communication interface between the feedback server and a feedback plugin; and (3) the feedback plugin is located on the client device and receives information and/or signals from a mail client and/or a website.

In yet another aspect, the present teachings provide another method of seeking feedback. One such exemplar method includes: (i) subscribing, using a feedback plugin, to be notified when a web browser visits one or more predefined web pages; (ii) receiving a notification at a feedback plugin that the web browser has visited or is visiting one or more the predefined web pages on a client device; (iii) transforming the feedback plugin from a non-active state to an active state; (iv) retrieving, using the feedback plugin and in response to the step of receiving of the notification in (i), at least a portion of one or more the predefined web pages from the client device into the feedback plugin; (v) analyzing, using the feedback plugin, at least the portion of one or more the predefined web pages to identify information relating to potential mention of one or more individuals in one or more the predefined web pages; (vi) conveying the information relating to potential mention of one or more of the individuals, from the feedback plugin to a feedback server, to gain insight into whether the information relating to potential mention of one or more of the individuals in one or more of the predefined web pages is related to one or more relevant individuals, wherein one or more relevant individuals are those that the user is qualified to provide feedback for; (vii) accepting from the feedback server a user profile for one or more of the relevant individuals; and (viii) displaying and/or causing to display, using the feedback server and/or the feedback plugin and on or adjacent to one or more of the predefined web pages on the client device, the user interface and/or a panel for obtaining feedback on at least some of the relevant individuals. The feedback plugin is communicatively coupled to or installed on the client device, which is associated with a user.

The user interface and/or the panel is constructed using the user profile. In the above-mentioned step of displaying and/or causing to display, the web server provides one or more of the predefined web pages and the feedback server and/or the feedback plugin provides the user interface and/or the panel that is displayed on the client device. Further, the feedback server is different from the web server.

In one embodiment, the present method of seeking feedback further includes receiving, at the feedback plugin, a grant of subscription from the web browser. The above-mentioned step of subscribing includes parsing a manifested file on the feedback plugin. The manifested file includes a list of one or more predefined web pages, and the above-mentioned step of receiving includes receiving notification when the web browser visits one or more of the predefined web pages listed in the manifested file.

Further, this receiving step may include: (i) monitoring, using the feedback plugin, for receipt of a document object model ("DOM") mutation event notification from the client device when structure of a DOM associated with the predefined website undergoes a change; and (ii) receiving, at the feedback plugin, the DOM mutation event notification from the client device.

The monitoring step may include monitoring DOM mutation events to identify a condition when the DOM mutation event matches a predefined attribute selector (e.g., a cascading style selector). The above-mentioned transforming step may include transforming the feedback plugin from the inactive state to an active state when the DOM mutation event matches the predefined attribute selector. The DOM mutation event may be generated at beginning, end or reiteration of an animation event.

In one embodiment of the present teachings, the step of displaying and/or the step of causing to display includes determining, using the feedback plugin, whether enough space is present, at the client device, to replace a sidebar element in an email interface or place a user interface in or adjacent to one or more of the predefined web pages. In another implementation of this step, a sidebar element in an email interface is replaced with an entire boundary that encompasses electronic content of interest, at least some of which is obtained from the feedback server. A yet another aspect of this step includes replacing a sidebar element in an email interface with one or more user profiles of individuals deemed relevant in light of recently uploaded email message or electronic content at the feedback plugin. In yet another aspect of this step, the user interface is displayed and/or caused to be displayed as a webpage in an iframe, which includes the user profile.

The above-mentioned displaying and/or causing to display step may include manipulating a sidebar element in an email interface to display a recent user profile. The recent user profile is arrived at by retrieving, using the feedback plugin, at least a portion of one or more of recent predefined web pages. The recent predefined web pages are retrieved later in time than the predefined web pages (which were retrieved initially). In this embodiment, the recent predefined web pages may include email messages or electronic content. The step of manipulating the sidebar element in the email interface, preferably, includes manipulating a rectangle that includes a web page or a frame, which includes content of email messages.

In yet another aspect, the present teachings provide yet another method of seeking feedback. This method includes: (i) registering an end point of a feedback plugin in a connection between the feedback plugin and a feedback server; (ii) receiving, from the feedback plugin through the end point and at the feedback server, information relating to potential mention of one or more individuals to gain insight into whether identity of one or more of the individuals is present in an electronic content; (iii) identifying one or more relevant individuals, if information relating to identity of one or more of the individuals is present in the information relating to potential mention of one or more of the individuals obtained from the receiving and if one or more of the individuals are those that the feedback server determines the user to be qualified to provide feedback for; (iv) collecting, using the feedback server, additional information about one or more of the relevant individuals to generate a user profile for each of one or more of the relevant individuals; (v) transmitting, from the feedback server to the feedback plugin, the user profile, wherein the user profile provided by the feedback server is more informative about one or more of the relevant individuals than the information relating to potential mention of one or more of the individuals that was received at the feedback server; and (vi) displaying and/or causing to display, using the feedback server and/or the feedback plugin and on or adjacent to the electronic content on the client device, a user interface and/or a panel for obtaining feedback on at least some of the relevant individuals. The user interface and/or the panel is constructed using the user profile, and during the above-mentioned step of displaying and/or causing to display, an electronic content provider provides the specified electronic content and the feedback server and/or the feedback plugin provide the user interface and/or the panel. In this scenario, the feedback server is different from the electronic content provider.

The information relating to potential mention of one or more of the individuals does not necessarily convey knowledge about one or more of the individuals. The electronic content is or was active on a client device.

The information relating to potential mention of one or more of the individuals is, preferably, in form of a web request and the feedback server is configured to accept this web request from the feedback plugin.

In the above-mentioned identifying step, one or more of the relevant individuals may include parsing or breaking down, using the feedback server, potential mentions of one or more of the individuals to prepare a URL of an iframe. In this embodiment of the present teachings, the above-mentioned transmitting step includes transmitting the URL of the iframe from the feedback server to the feedback plugin, and the above-mentioned displaying and/or causing to display step, using the feedback server and/or the feedback plugin, includes displaying and/or causing to display the iframe on or adjacent to the electronic content on the client device.

BRIEF DESCRIPTION OF THE DRAWINGS

FIG. 8 shows a table, according to one embodiment of the present teachings and that shows exemplar code that implements certain salient functions of the feedback plugin.

FIG. 9 shows a table, according to one embodiment of the present teachings and that shows exemplar code that implements certain salient functions of the feedback server.

DETAILED DESCRIPTION OF THE PREFERRED EMBODIMENTS

In the following description, numerous specific details are set forth in order to provide a thorough understanding of the present invention. It will be apparent, however, to one skilled in the art that the present invention may be practiced without limitation to some or all of these specific details. By way of example, although various examples and embodiments describe systems and methods for seeking feedback for individual performance, the same systems and methods of the present teaching equally apply to effectively assigning individual tasks, conveying a "to-do list," sharing an agenda between two or more users and managing individual and/or team goals. In other instances, well-known process steps have not been described in detail in order to not unnecessarily obscure the invention.

Embodiments presented herein describe systems and methods for, among other things, effecting interactions with a client device, over a computer network. In preferred implementations of these embodiments, a user who is performing a task, such as reviewing a web page or an application window, is automatically served with a user interface and/or a panel that seeks feedback regarding performance of certain individuals that are mentioned on the web page or the application window. The systems and methods of the present teachings may be incorporated in a client device that accesses through a network (e.g., the Internet) a feedback server, which facilitates displaying the feedback user interface and/or panel on the client device. As a result, the novel systems and methods of the present teachings automatically seek feedback that is both—timely and specific. The feedback is timely because it occurs real-time when a particular job is underway. The feedback is also specific as the user interface and/or panel allows the user to answer specific questions that are relevant to the job when the job is underway.

Figure 1A:
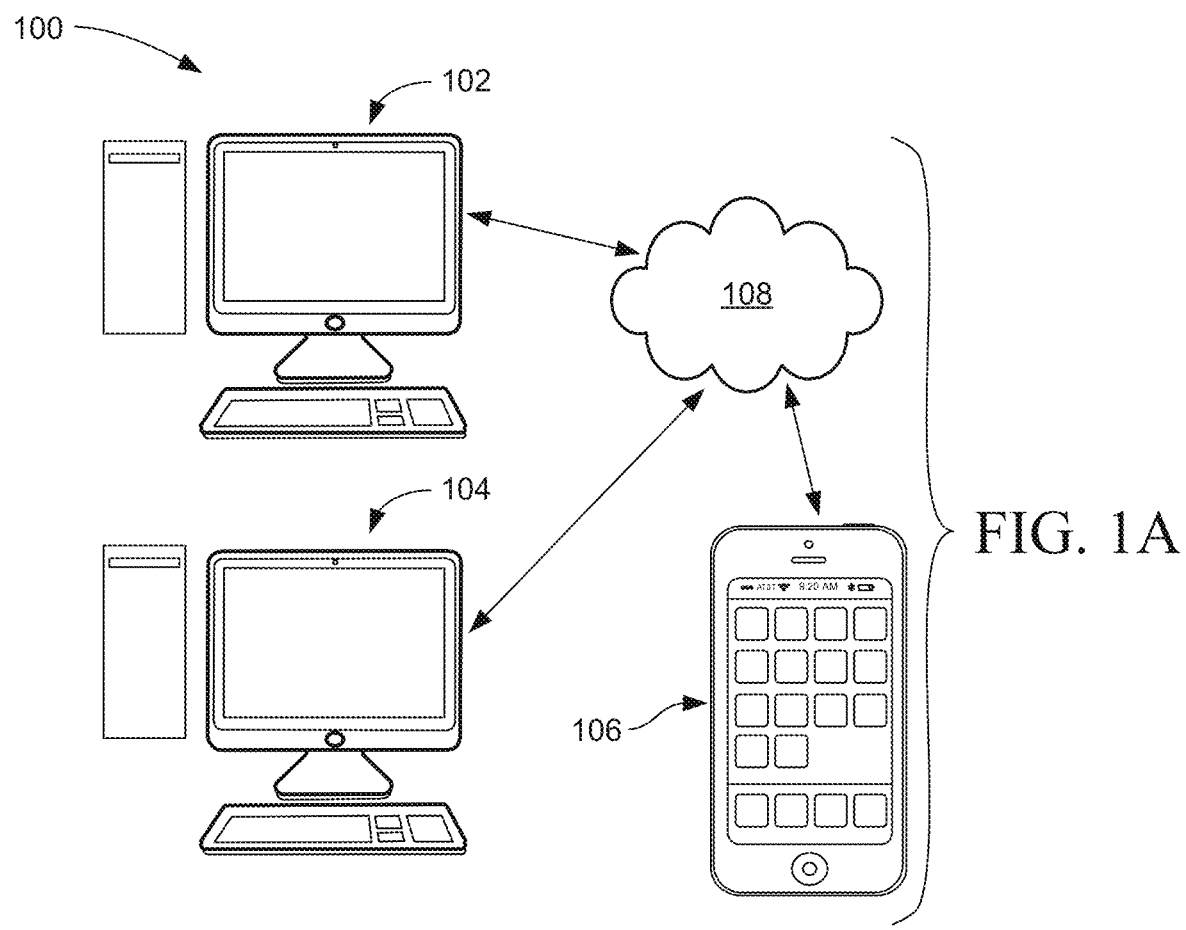
FIG. 1A shows a network-based platform, according to one embodiment of the present arrangements, and that couples multiple computing machines, e.g., a server and multiple client devices (e.g., a desktop computer and a mobile device) to each other for displaying a user interface and/or a panel for seeking feedback on certain individuals.

FIG. 1A is an illustrative schematic of one embodiment of the present arrangements that includes a feedback seeking platform 100 including multiple computing devices, shown as three exemplar machines 102, 104 and 106. In the embodiment shown in FIG. 1A, computing device 102 is a feedback server and computing devices 104 and 106 are referred to as "client devices." A network 108 (e.g., the Internet) couples feedback server 102 and client devices 104 and/or 106, to enable communication amongst them. As will be appreciated by those skilled in the art, any computing devices (e.g., server, desktop computer, laptop computer, tablet, or mobile device) may be used as one of feedback server 102 and client devices 104 and 106 and configured to perform some or all of the functions contemplated in the present teachings. Furthermore, system 100 may include multiple computing machines to serve the functions of each of feedback server 102 and each of client devices 104 and/or 106.

Representative client devices 104 and 106 (hereinafter sometimes also referred to as "user devices") include a smart phone, a portable digital assistant, a tablet or a stationary computing appliance. In certain embodiments of the present arrangements, each or any one of feedback server 102 and client devices 104 and/or 106 are a wireless machine, which is in wireless communication with network 108. In this embodiment of the present arrangements, feedback server 102 is involved during interaction and data flows to and from any of client devices 104 and/or 106. In general, feedback server 102 may include one or more computers and data storage devices, and may produce programming instructions, files, or data (e.g., user profile data for one or more relevant individuals) that may be transmitted over network 108 to client devices 104 and/or 106, which may be used by a user to provide performance feedback for one or more of relevant individuals, assign tasks to these individuals, convey a "to-do list" relevant to these individuals, share an agenda between two or more individuals and manage individual and/or team goals.

In certain embodiments of the present arrangements, as noted above, feedback seeking platform 100 includes several components, including but not limited to feedback server 102 and a plurality of client devices 104 and/or 106, which are programmed to cooperatively achieve one or more of the following functions: (1) receiving a notification that a specified electronic content is active on a client device (e.g., 104 or 106), which is associated with a user; (2) retrieving, at a discrete location inside the client device, at least a portion of the specified electronic content for analysis; (3) analyzing, at the discrete location inside the client device, at least the portion of the specified electronic content to identify information relating to potential mention of one or more individuals in the specified electronic content; (4) receiving, at the feedback server 102, information relating to potential mention of one or more individuals in the specified electronic content that is or was active on a client device; (5) identifying, using feedback server 102, one or more relevant individuals, if information relating to identity of one or more of the individuals is present in the information relating to potential mention of one or more of the individuals obtained from the above-mentioned receiving step in (1), and if one or more of the individuals are those that feedback server 102 determines a user to be qualified to provide feedback for; (6) collecting additional information about one or more of the relevant individuals to generate a user profile about such relevant individuals; (7) transmitting the user profile from feedback server 102 to client device (e.g., 104 or 106); and (8) displaying and/or causing to display, on the client device, a user interface and/or a panel (e.g., constructed using the user profile) for seeking feedback on at least some of the relevant individuals, assigning tasks to relevant individuals, conveying a "to-do list" to relevant individuals, sharing an agenda between the user and one or more relevant individuals and managing goals for one or more of the relevant individuals and/or teams.

In one embodiment of the present arrangements, client devices 104 and/or 106 are programmed to allow users to communicate with one another using a messaging system. To this end, feedback server 102 may serve as an intermediary in the communication, and stores information regarding feedback or task messages exchanged. A user using one or more of computing devices 104 and 106, in certain embodiments of the present arrangements, is an individual or a representative of an individual (such as a manager or supervisor in a company).

Figure 1B:
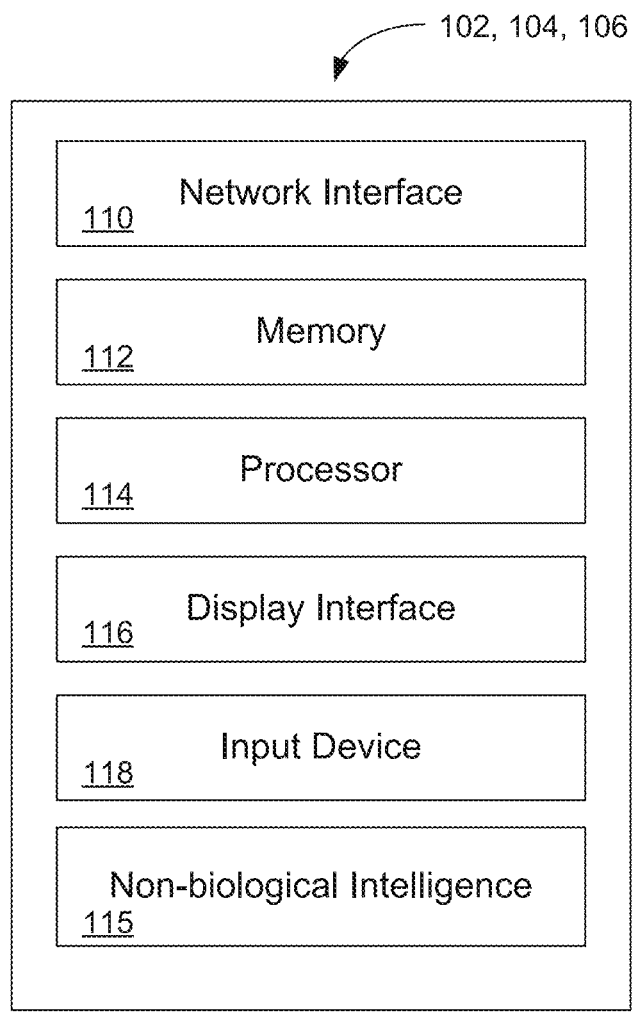
FIG. 1B shows a blocks diagram of internal components of one or more of the server and/or the client devices, according to one embodiment of the present arrangements and that are shown in FIG. 1A.

As shown in FIG. 1B, in accordance with one embodiment of the present arrangements, each of server 102 and client devices 104 and 106 include their own network interface 110, a memory 112, a processor 114, a display interface 116, and an input device 118. The present teachings recognize that the network interface 110, memory 112, and processor 114 of each of server 102 and client devices 104 and 106 are configured such that a program stored in memory 112 may be executed by processor 114 to accept different types of input (e.g., notification and/or signals from websites or applications) and/or provide output (e.g., a user interface and/or a panel) through network interface 110 over network 108 to another server/client device on system 100 of FIG. 1A.

Network interface 110 of each of server 102 and client devices 104 and 106 is used to communicate with another device on system 100 over a wired or wireless network, which may be, for example and without limitation, a cellular telephone network, a WiFi network or a WiMax network or a BlueTooth network, and then to other telephones through a public switched telephone network (PSTN) or to a satellite, or over the Internet. Memory 112 of devices 102, 104 and/or 106 includes programming required to operate each or any one of server 102 and client devices 104 and/or 106, such as an operating system or virtual machine instructions, and may include portions that store information or programming instructions obtained over network 108, or that are input by the user. In one embodiment of the present arrangements, display interface 116 and input device 118 of client device 106 are physically combined as a touch screen 116/118, providing the functions of display and input.

Figure 2:
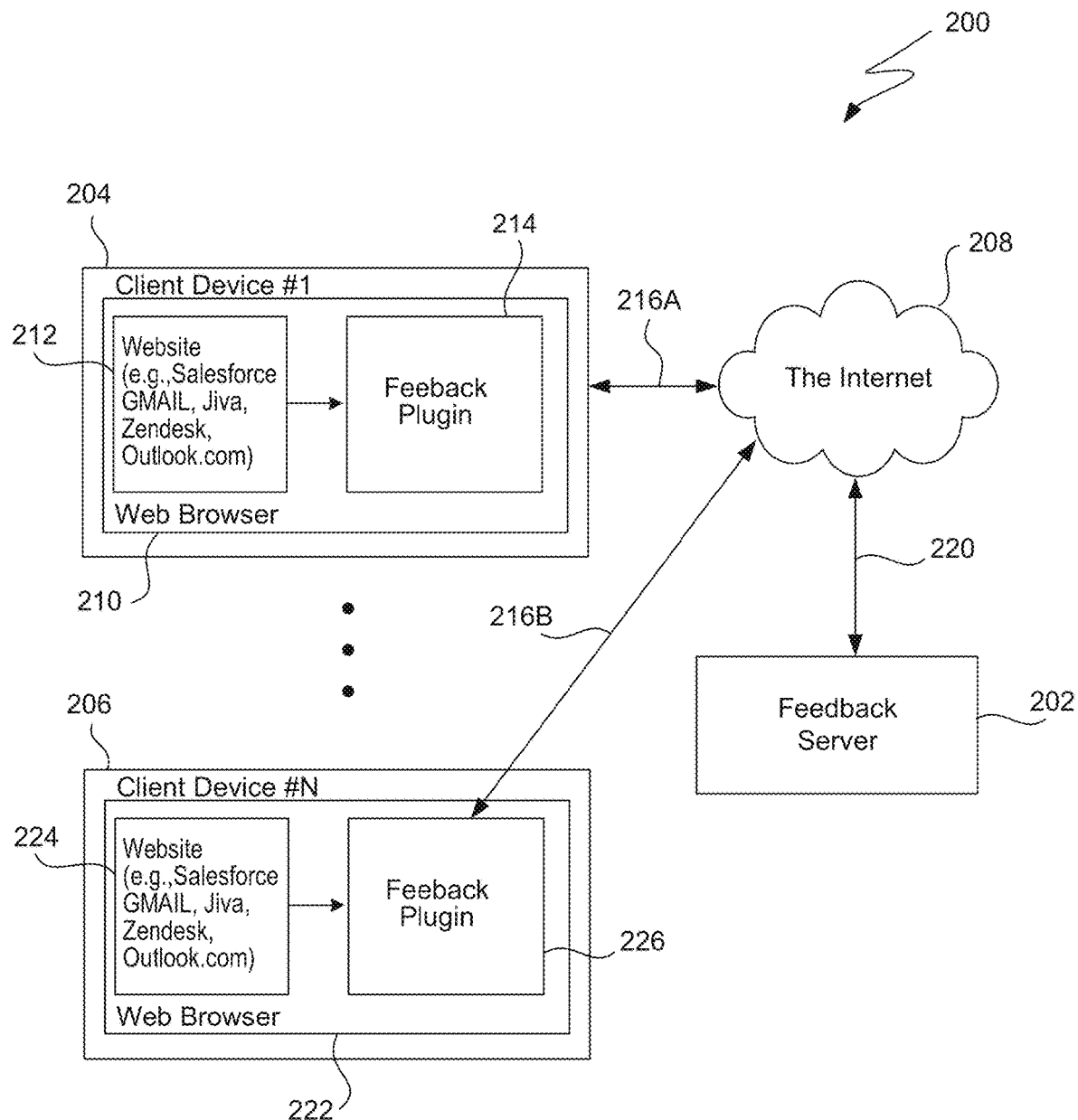
FIG. 2 shows a block diagram of a feedback seeking system, according to one embodiment of the present arrangements, for seeking feedback using a client device that has installed thereon a web browser that communicatively couples to a feedback plugin, which through a network connects to a feedback server such that the feedback plugin conveys signals and/or information to and from the web browser to the feedback server.

FIG. 2 shows details inside a feedback-seeking platform 200, according to one embodiment of the present arrangements. Feedback seeking platform 200 includes a feedback server 202 connecting through a network 208 (e.g., the Internet) to client devices 204/206, each of which are substantially similar to their counterparts, i.e., feedback server 102, network 108, and client devices 104/106 shown in FIG. 1A. In FIG. 2, each client device (e.g., each of 204 and 206) has installed thereon a web browser, which is communicatively coupled to a web server (not shown to simplify illustration). Further, the web browser, installed on each client device, is communicatively coupled to a feedback plugin. For example, a web browser 210, which is installed on client device 204, is communicatively coupled to a feedback plugin 214, and a web browser 222, which is installed on client device 206, is communicatively coupled to feedback plugin 226.

Each of feedback plugins 214 and 226, are bi-directionally coupled through a first bi-directional coupling 216A/216B, respectively, to network 208, and then from network 208 through a second bi-directional coupling 220 to feedback server 202. As a result of this arrangement, feedback plugins 214 and 226 are configured to transmit information to and from feedback server 202.

The web server hosts on client devices 204 and 206 a website 212/224, respectively. In one preferred arrangement, each website 212/224 is communicatively coupled to provide information to one of feedback plugins 214/226. As will be explained later, this arrangement of website 212/224, feedback plugins 214/226 and feedback server 202 allows feedback seeking platform 200 to automatically obtain feedback from a user, in real-time, i.e., as the user is viewing a website (e.g., Salesforce.com, Gmail, Jiva, Zendesk or Outlook.com). If the questions, in a user interface and/or panel designed to elicit feedback are effective, then the feedback obtained is both timely and of requisite specificity.

Figure 3:
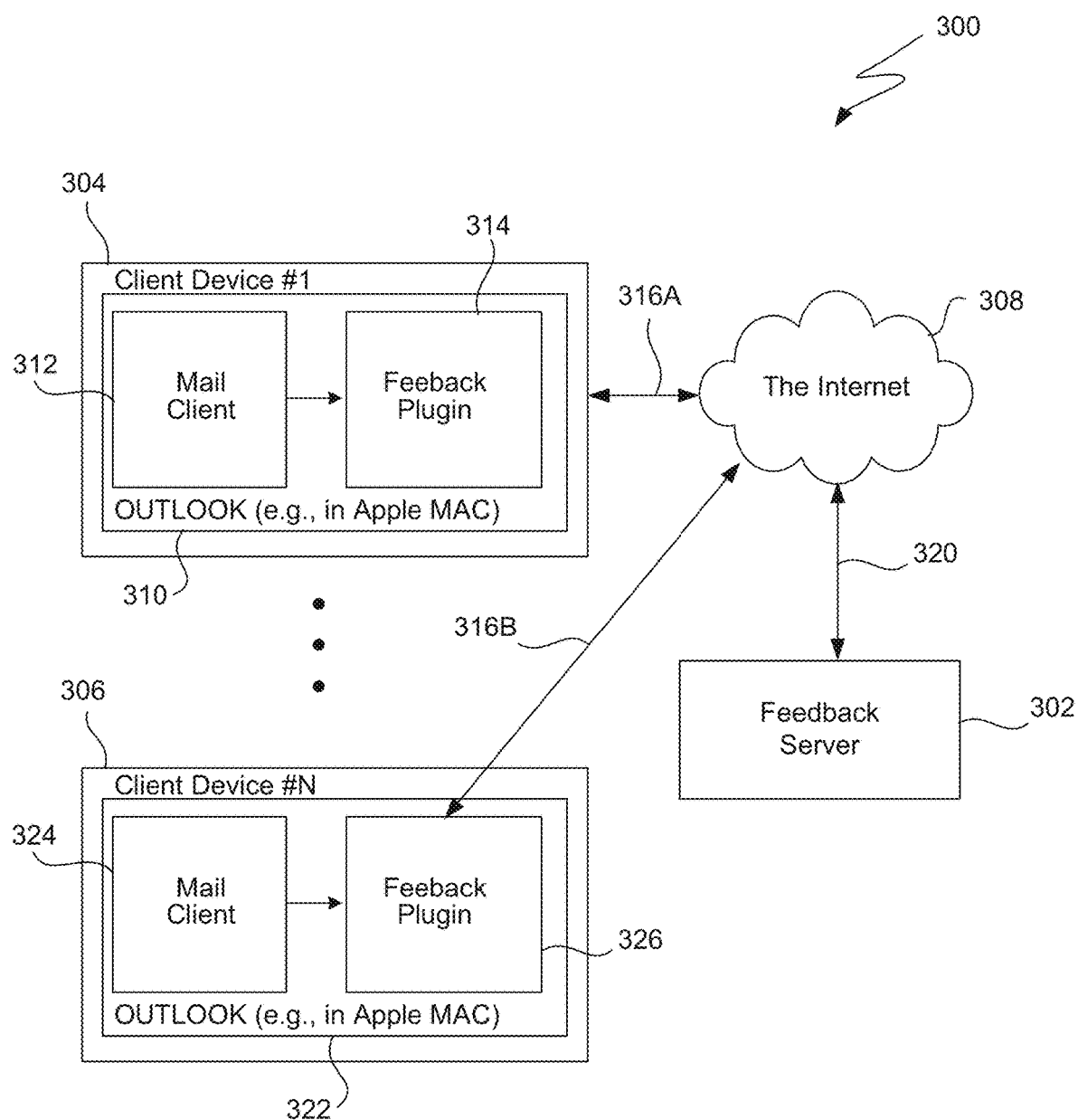
FIG. 3 shows a block diagram of a system, according to another embodiment of the present arrangements, for seeking feedback using a client device that has installed thereon an application-based mail client that communicatively couples to a feedback plugin, which through a network connects to a feedback server such that the feedback plugin conveys signals and/or information to and from the application-based mail client to the feedback server.

Feedback seeking platform 200 is not limited to only seeking feedback, but also extends to assigning tasks to relevant individuals, conveying a "to-do list" to relevant individuals, sharing an agenda between the user and one or more relevant individuals and managing goals of the user and/or one or more of the relevant individuals and/or teams. As a result, feedback seeking platform 200 may be configured to operate as a task assigning platform, a list conveying platform, an agenda sharing platform or a goal management platform that do not necessarily provide feedback. FIG. 3 described below relates to applications hosted on the client device, and is similarly not limited to providing feedback.

FIG. 3 illustrates that a timely feedback of requisite specificity is also obtained by the present arrangements when the client device hosts an application such as an electronic mail program (e.g., Outlook in the Apple OS X Operating System). As shown in this figure, a feedback seeking platform 300, according to another embodiment of the present arrangements, is arranged to include a feedback server 302, client devices 304/306, a network 308, feedback plugins 314/326, a first bi-directional coupling 316A/316B, a second bi-directional coupling 320 in a manner that is substantially similar to their counterparts, feedback server 202, client devices 204/206, a network 208, feedback plugins 214/226, a first bi-directional coupling 216A/216B, a second bi-directional coupling 220 of FIG. 2. As a result of this arrangement, feedback plugins 314/326 of FIG. 3 are communicatively coupled not to a website, but to an application 310/322, e.g., the Outlook electronic mail program in the Apple OS X Operating System, respectively, installed on client devices 304/306. By way of example, the application in client devices 304/306 of FIG. 3 is a mail client 312/324, respectively, that is communicatively coupled to a mail server (not shown to simplify illustration). In this configuration, the mail server serves an electronic mail on the mail client and the feedback plugins receive notifications and monitor changes to the mail client displayed or active on the client device.

Figure 4:
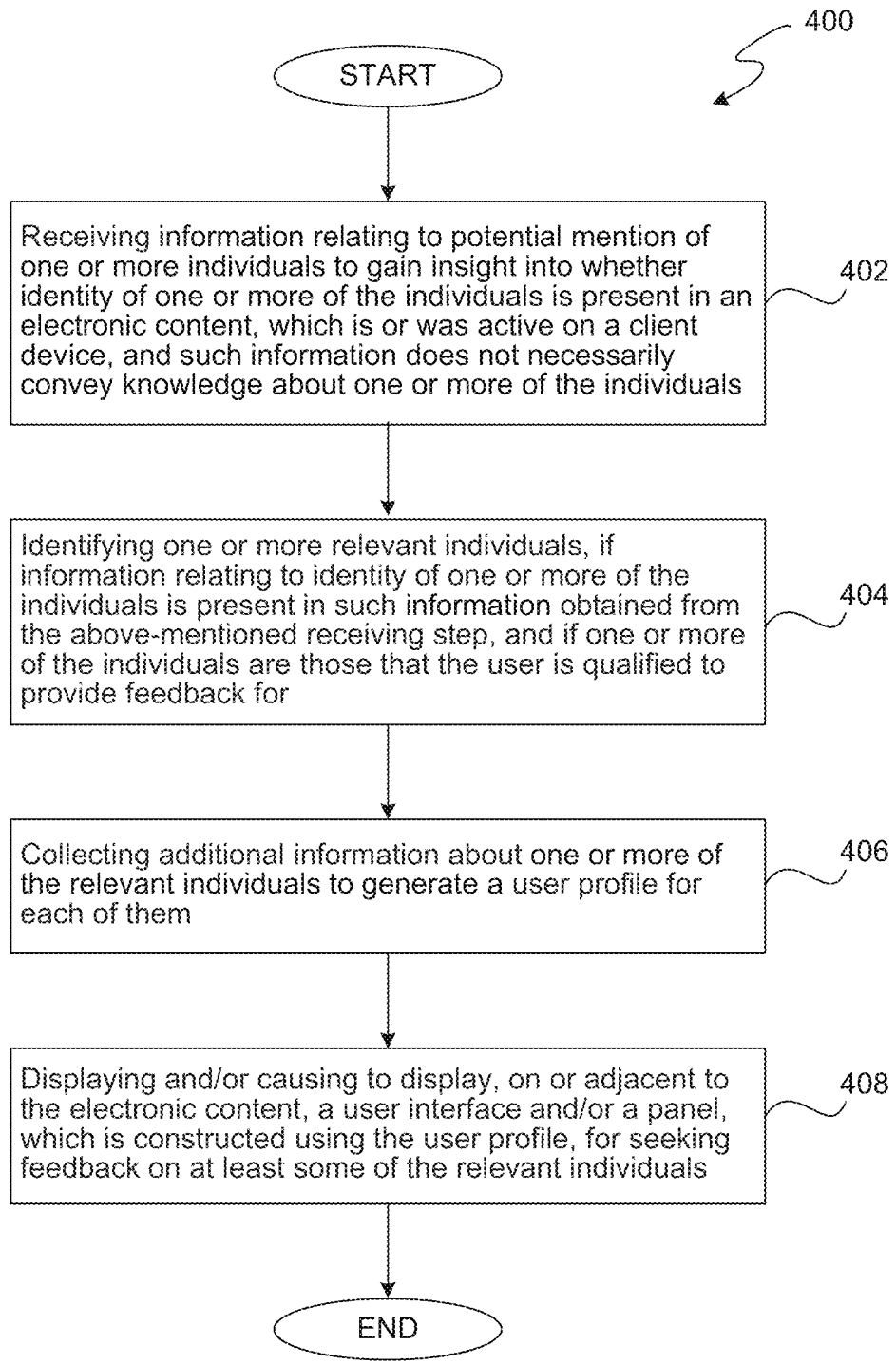
FIG. 4 shows a process flow diagram for a method, according to one embodiment of the present teachings, for seeking feedback for individuals mentioned in an electronic mail.

FIG. 4 shows a feedback seeking process 400, according to one embodiment of the present teachings and that may be used to obtain, among other things, feedback on individual performance. Feedback seeking process may begin with a step 402, which includes receiving information relating to potential mention of one or more individuals to gain insight into whether identity of one or more of the individuals is present in an electronic content. The electronic content may be a website, a web mail or an application window. In this step, the electronic content is or was active on a client device when such information is received preferably at a feedback plugin (e.g., feedback plugin 214/314, 226/326 of FIGS. 2 and 3, respectively). Moreover, such information does not necessarily convey knowledge about one or more of the individuals. Rather, it conveys information that may refer to one or more individuals or that may identify one or more individuals.

Next, a step 404 includes identifying one or more relevant individuals. If information relating to identity of one or more of the individuals is present in such information obtained from receiving step 402, and if one or more of the individuals are those that the user is qualified to provide feedback for, then one or more of such individuals are identified as one or more relevant individuals.

Feedback seeking process 400 then proceeds to step 406. In this step, additional information about one or more of the relevant individuals identified in identifying step 404 are collected to generate a user profile for each of the relevant individuals.

After the conclusion of step 406, a step 408 includes displaying and/or causing to display, a user interface and/or a panel. This interface and/or panel is constructed using the user profile and preferably seeks feedback regarding at least some of the relevant individuals.

In one preferred embodiment of the present teachings, feedback seeking process 400, as described above, details the salient steps involved between a feedback plugin (e.g., feedback plugin 214/314, 226/326 of FIGS. 2 and 3, respectively) and a feedback server (e.g., feedback server 202 and 302 of FIGS. 2 and 3, respectively). Before carrying out receiving step 402, process 400 preferably includes a step of subscribing to the electronic content (e.g., website, web mail or application) that is capable of being accessed on the client device. In this step, the feedback plugin may perform a variety of functions depending on the type of electronic content present or active on the client device.

By way of example, if a website is the type of electronic content that is of interest, then process 400 includes various steps, which preferably begin with utilizing, via programming, a built-in application program interface ("API") of the web browser to provide the information described in receiving step 402 or a signal relating to such information. According to the programming, such information is conveyed to the feedback plugin when a predefined website is active (e.g., loaded and/or displayed) on the web browser of the client device. Once the programming step is complete, the feedback plugin is prepared to receive information from the web browser regarding the active status of the predefined website.

Next, an accepting step may include accepting a notification, at the feedback plugin, that the predefined website is active on the web browser. Such a notification may transform the feedback plugin from a non-activated state to an activated state of operation. In the activated state, the feedback plugin is prepared to monitor the predefined website for any changes.

Before receiving step 402 commences, the feedback plugin (in its activated state) preferably monitors changes in the predefined website to identify the information relating to potential mention of one or more of individuals. Examples of monitoring activities performed by the feedback plugin include—screen scraping the predefined website and monitoring for receipt of a document object model ("DOM") mutation event notification from the client device when structure of a DOM associated with the predefined website undergoes a change. Examples of screen scraping include—monitoring content of a predefined HTML page or a section of the predefined HTML page. In this monitoring function, the feedback plugin preferably determines if there is a change in the content of the predefined HTML page or a section of the predefined HTML page. Regardless of whether the change is in the content of the predefined HTML page or a section of the predefined HTML page, the feedback plugin receives information that may relate to potential mention of one or more individuals who are candidates for receiving performance-based feedback.

The present teachings also recognize that although when a predefined website is active on the client device, the API of the web browser may be programmed to voluntarily communicate the active status of a predefined website to the feedback plugin, but that the ability to so communicate is not available for other types of electronic content. In other words, in certain instances the client device may not be able to provide an interface that informs on the status of the electronic content in the absence of a prompt, which requests information regarding the status of the electronic content; specifically, whether the electronic content is active on the client device. An Outlook program window hosted on the Apple OS X Operating System is one example of electronic content that does not voluntarily communicate its status, and therefore the present teachings recognize that different measures are preferably implemented.

To this end, if an application (e.g., electronic mail program like Outlook launched in the Apple OS X Operating System) is the type that hosts electronic content that is of interest, then process 400 includes various steps, which preferably begin with programming that utilizes an Accessibility API of an operating system installed on the client device to provide a notification when a new or different application is active (e.g., loaded and/or displayed) on the client device. Next, an accepting step includes accepting the notification, at the feedback plugin, that a new or different application is active on the client device. Similar to the case with the predefine website, such a notification of a new or different application being active, transforms the feedback plugin from a non-activated state to an activated state of operation. Then, a monitoring step includes monitoring, in an activated state of the feedback plugin, the new or different application to identify the information relating to potential mention of one or more individuals.

By way of example, monitoring of the new or the different application includes—determining, using the Accessibility API, when a user interacts with the new or the different application and/or when certain predefined scripts are executed on the client device. User interactions, which are preferably monitored by the feedback plugin, may include at least one user action chosen from group comprising mouse clicks, keyboard presses, screen touches and gestures. Examples of certain predefined scripts that may be executed on the client device include JavaScripts and/or DOM events.

When a user interacts with the Outlook program, for example, the program will execute undocumented script files, specifically script files written in the language of "Apple Script." Such script files informs on the user interaction with the program (e.g., informing if the user clicked on an email or when reviewing a series of different emails, each time the user clicks on a different email). In other words, in the above-described determining step, the Accessibility API allows a feedback plugin to "listen" for signals that are generated by the application, i.e., the Outlook program, and that results from the user's interaction with the application or when certain predefined scripts are executed on the client device. Stated another way, the user interactions with the application or execution of certain predefined scripts on the client device "prompt" the feedback plugin to send to the application a request for status of the electronic content. In this manner, the feedback plugin may "listen" to the application that is running on the client device.

As explained above, the present teachings recognize that, in certain instances, an applications window, which provides information about some relevant individuals, is the electronic content of interest. As explained in connection with identifying step 404 of FIG. 4, relevant individuals refers to individuals that a user is qualified to provide feedback for. Examples of such application windows include browser window, chat window and calendar window.

Regardless of whether the electronic content is a web page or an application window that is active on a client device, the present teachings offer a subscribing step, which is preferably implemented before receiving step 402 and allows a feedback plugin to "listen" to any specified electronic content that is active on the client device. Representative types of specified electronic content includes predefined web page, predefined web mail and predefined application window.

In accordance with preferred embodiments of the present teachings, the subscribing step may begin with accepting (e.g., at a feedback plugin) a notification from a client device that a specified electronic content (e.g. predefined website or a predefined application) is active (e.g., launched) on the client device. Such a notification transforms the feedback plugin from a non-activated state to an activated state of operation. Next, the subscribing step includes monitoring, e.g., using a feedback plugin in an activated state, changes in content inside the specified electronic content to identify when such content includes information relating to potential mention of one or more individuals. In one preferred embodiment of the present teachings, the feedback plugin is not monitoring at all times, but only when it is in its activated state of operation. Moreover, when a feedback plugin is implemented and is operating in its activated state, it identifies content that is suspected to contain the identity one or more individuals. As explained below, however, that after the feedback server process the information received from the feedback plugin, it is clear whether or not the information received at the feedback plugin (from the electronic content active on the client device) contains the identity of one or more individuals.

Referring back to the monitoring step and in the context of subscribing to a predefined applications window, monitoring of an application includes detecting, using the feedback plugin, one or more monitoring signals generated from the relevant applications to infer contextual information that may be informative regarding identity of one or more individuals. The present teachings recognize many ways to monitor applications. Some examples presented above include monitoring user interaction with the application and monitoring executing of unofficial script files (e.g., files in "Apple Script" language). Other examples of monitoring one or more applications include monitoring a signal produced by such application(s) and the signal is not supported or not documented by the electronic content provider or application vendor. In one scenario of this example, a software vendor may not support the signal that the software produces. In another scenario of this example, an application vendor (e.g., Microsoft) and/or electronic content provider (e.g., Google providing Gmail or Yahoo providing Yahoo mail or an internal company electronic mail system) may not support the signal produced by the application (which may be an electronic mail application).

A yet another example of monitoring one or more applications includes monitoring a signal generated by changes in the user interface of the client device. In this example, the changes in the user interface of the client device are independent of the user or user interactions. In one scenario of this example, an electronic mail is received at the mail client and the monitoring function includes monitoring log files, which track internal information, and that are typically useful for the software vendor for, among other things, diagnostic purposes. In another scenario of this example, changes in the client device's user interface includes new screen loading and/or content changes on the client device. Regardless of the manner in which the monitoring step and/or the subscribing step are performed, upon the conclusion of these steps, the feedback plugin is prepared to facilitate receiving step 402 of FIG. 4.

In one embodiment of the present teachings, receiving step 402 is carried out using the feedback plugin (e.g., feedback plugin 214/314, 226/326 of FIGS. 2 and 3, respectively) and feedback server (e.g., feedback server 202 and 302 of FIGS. 2 and 3, respectively). Specifically, information relating to potential mention of one or more individuals is preferably sent from the feedback plugin and received by the feedback server. As shown in the embodiments shown in FIGS. 2 and 3, the feedback plugin is communicatively coupled to a client device associated with a user and the information regarding the potential mention of one or more individuals present on the client device is received at the feedback plugin, and is in turn, conveyed to the feedback server, which is communicatively coupled through a network to the feedback plugin. The feedback server may include instructions for, among other things: (1) determining if that the information relating to potential mention of one or more individuals actually identifies any individuals as described in identifying step 404 of FIG. 4; (2) determining which, if any, of the identified one or more individuals are those that the user is qualified to provide feedback for (to identify one or more relevant individuals as described in identifying step 404); (3) collecting additional information about one or more of the relevant individuals as identified in step 406; (4) generating a user profile for each of the relevant individuals as identified in step 406; and (5) transmitting to the feedback plugin the user profile of one or more relevant individuals so that the feedback plugin may appropriately process that information.

The feedback plugin, using the user profiles of one or more relevant individuals, displays and/or causes to display on or adjacent to the electronic content on the client device a user interface and/or panel for obtaining feedback on at least some of the relevant individuals. During this step of displaying and/or causing to display on the client device, an electronic content provider provides the electronic content and the feedback server and/of the feedback plugin provide the user interface and/or the panel. In a preferred configuration of the present arrangements, the feedback server is different from the electronic content provider.

In one embodiment of the present arrangements, the feedback plugin is part of or communicatively coupled to a web browser as shown in FIG. 2. In this configuration, the web browser is installed on the client device and hosts the electronic content preferably in the form of a web page on the client device. Moreover, a web server, which is different from the feedback server (e.g., feedback server 202 of FIG. 2), provides the web page.

In one alternate embodiment of the present arrangements, the feedback plugin is part of or communicatively coupled to a web-based mail client page on the client device also shown in FIG. 2. In this configuration, a web browser hosts the web-based mail client page on the client device. As a result, a web-based mail server provides the web-based mail client page and the web-based mail server is different from the feedback server. Representative examples of a web-based mail client include Gmail, Outlook.com, Yahoo mail and their providers are Google, Microsoft, Yahoo, respectively. In some instances, third parties, who contract with these electronic content providers, may provide the web-based mail client.

In another alternate embodiment of the present arrangements, the feedback plugin is communicatively coupled to an application installed on the client device as shown in FIG. 3. In this configuration, the application may be communicatively coupled to an electronic content provider, which is different from the feedback server. By way of example, if an application-based mail client hosts electronic mail on the client device, then the electronic content provider is an application-based server, which is different from the feedback server. Representative examples of an application-based mail client include Gmail and Outlook.

Figure 7A:
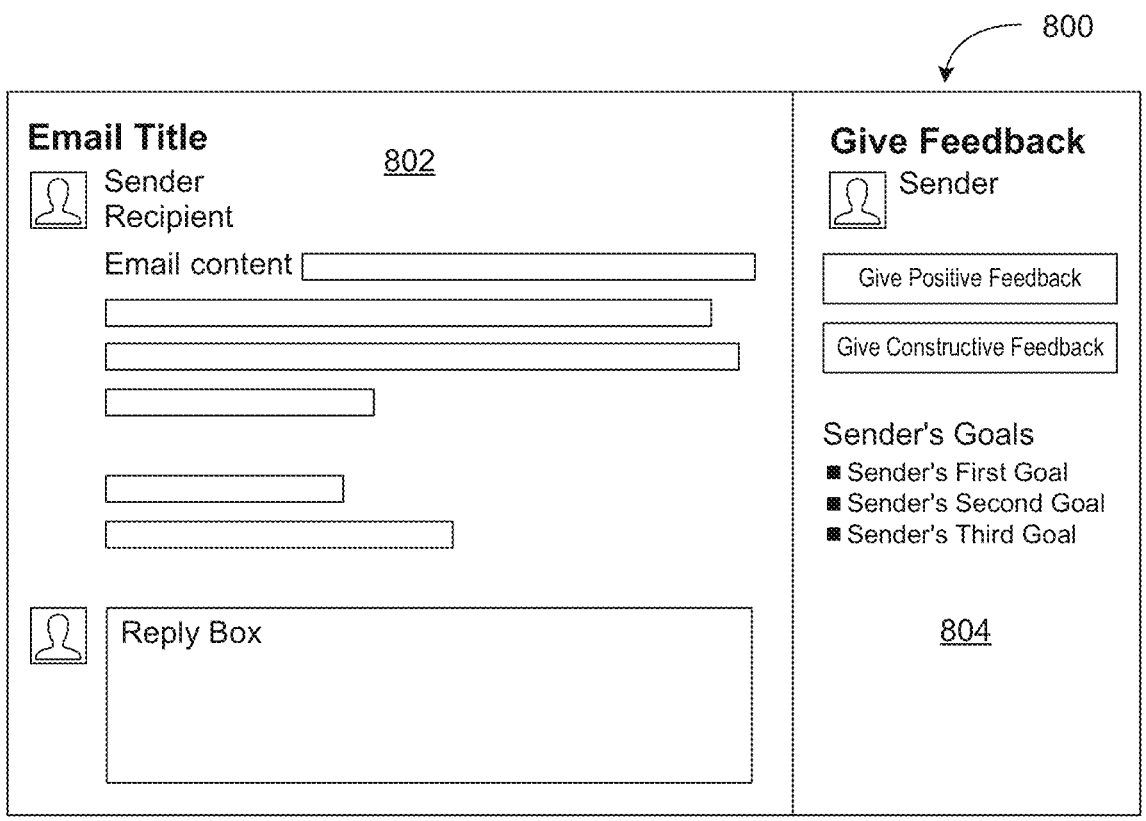
FIG. 7A shows a screen shot, according to one embodiment of the present teachings and that shows an exemplar user interface and/or a panel that is disposed adjacent to an electronic mail that is displayed on the client device.
Figure 7B:
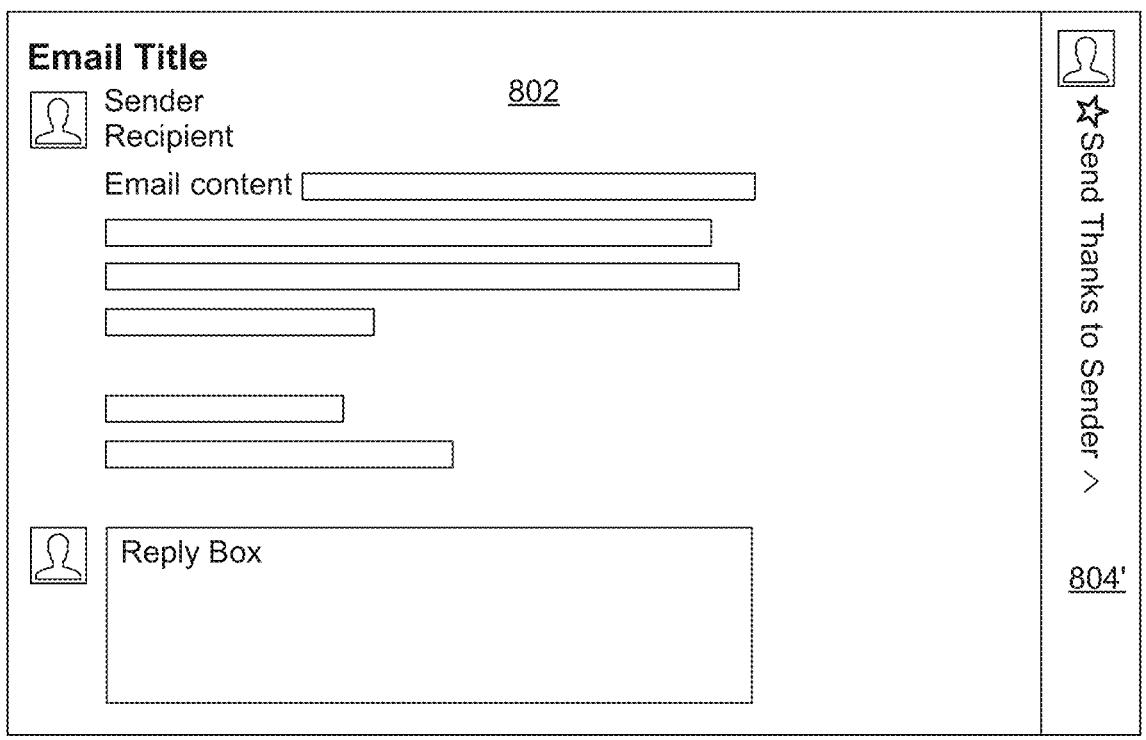
FIG. 7B shows another screen shot, according to another embodiment of the present teachings and that shows the exemplar user interface and/or the panel of FIG. 7A in a collapsed form so that more viewable real estate is available to the user for viewing the electronic content (e.g., website, web mail or application window).

FIGS. 7A and 7B show a screenshot of an exemplar user interface and/or panel that results from displaying and/or causing to display step 408 of FIG. 4. In FIG. 7A, user interface 800 shows a feedback panel 804 disposed adjacent to an electronic mail 802. In FIG. 7B, user interface 800' shows a collapsed feedback panel 804' disposed adjacent to electronic mail 802. In the collapsed configuration of the feedback panel as shown in FIG. 7B the user has more real estate available to view electronic mail 802.

In one embodiment of the present teachings, displaying and/or causing to display step 408 of FIG. 4 includes: (1) determining an appropriate location and/or size of the user interface (e.g., user interfaces 800 or 800' of FIGS. 7A and 7B) and/or the panel (e.g., feedback panel 804 or 804' of FIGS. 7A and 7B) for seeking input, such as seeking feedback regarding individual performance, assigning tasks to one or more relevant individuals, conveying a "to-do list" to one or more relevant individuals, sharing an agenda with one or more relevant individuals and managing goals of the user and one or more individuals and/or team; and (2) positioning the user interface and/or the panel for gathering feedback next to the electronic content (e.g., electronic mail 802 of FIGS. 7A and 7B).

The user interface (e.g., user interfaces 800 or 800' of FIGS. 7A and 7B) and/or the panel (e.g., feedback panel 804 or 804' of FIGS. 7A and 7B) are preferably constructed using a user profile for each of the one or more relevant individuals. Representative information for each of the one or more relevant individuals presented in the panel includes full name, employer, job title, supervisor's name, supervisor's electronic mail address and the user's relationship to the individual (e.g., peer, supervisor or direct report). In another embodiment of the present teachings, based on the information received from the feedback server, the feedback plugin customizes the user interface and/or the panel presented to the user.

Figure 5:
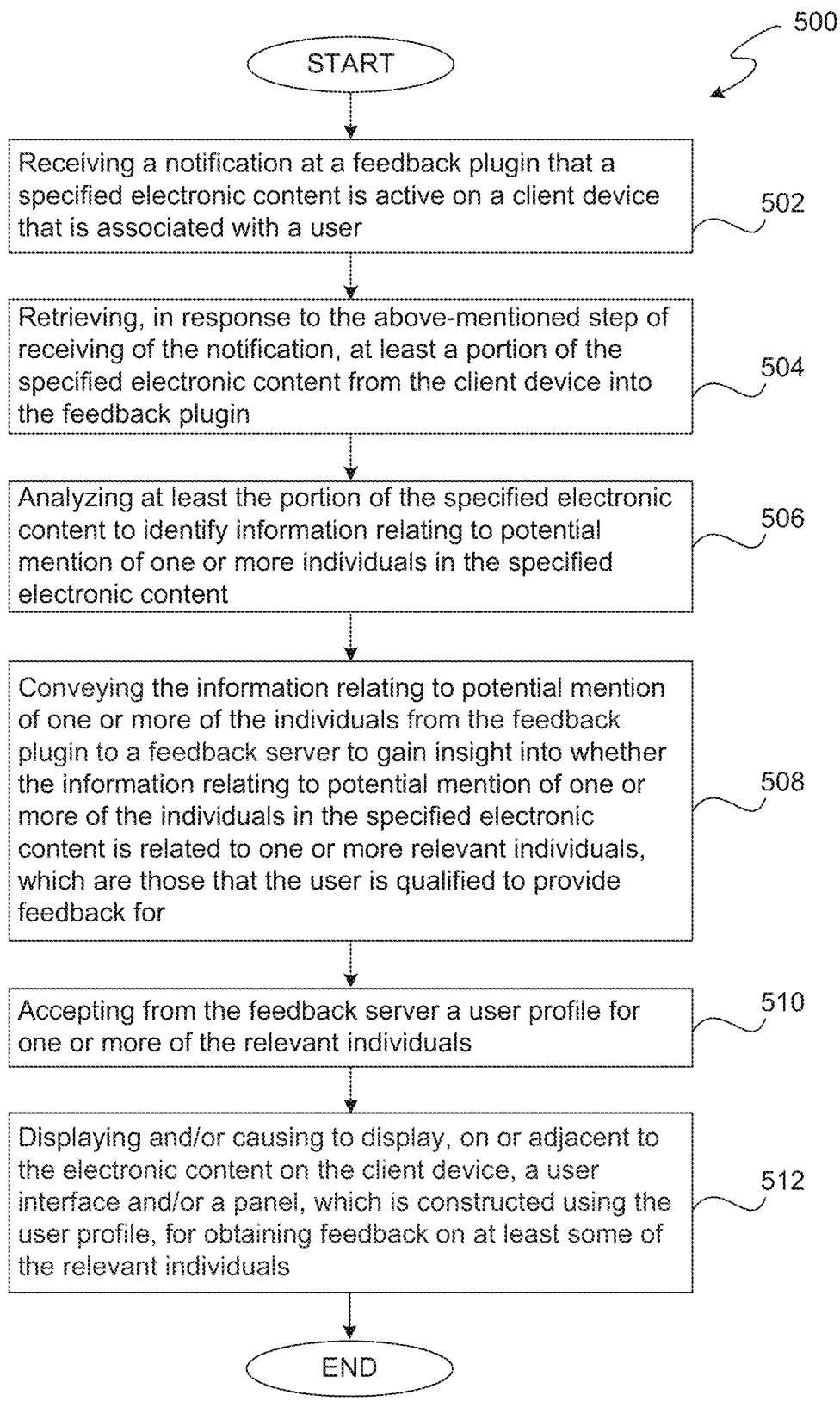
FIG. 5 shows a process flow diagram for a method, according to one embodiment of the present teachings, for seeking feedback for individuals that are mentioned in a specified electronic content (e.g., a predefined website, a predefined web mail or a predefined application window).

FIG. 5 shows another feedback seeking process 500, according to an alternate embodiment of the present teachings and that may be used to obtain, among other things, feedback on individual performance. Feedback seeking process may begin with a step 502, which includes receiving a notification at a feedback plugin that a specified electronic content (e.g., a predefined website, a predefined web mail page or a predefined application window) is active on a client device. Next, a step 504 includes retrieving, in response to receiving step 502, at least a portion of the specified electronic content from the client device into the feedback plugin.

Then, a step 506 is implemented and it includes analyzing at least the portion of the specified electronic content mentioned in step 504, to identify information relating to potential mention of one or more individuals in the specified electronic content.

Process 500 then proceeds to step 508, which includes conveying, from the feedback plugin to a feedback server, the information relating to potential mention of one or more of the individuals to gain insight into whether the information relating to potential mention of one or more of the individuals in the specified content is related to one or more relevant individuals. As explained before, one or more relevant individuals are those that the user is qualified to provide feedback for.

After the conclusion of step 508, step 510 includes accepting from the feedback server the user profile for one or more of the relevant individuals.

Finally, process 500 may end with step 512, which includes displaying and/or causing to display a user interface and/or a panel for obtaining feedback on at least some of the relevant individuals. In this step, the user interface and/or panel is disposed on or adjacent to the electronic content on the client device, and is constructed using the user profile mentioned in accepting step 510.

In one preferred embodiment of the present teachings, feedback seeking process 500, as described above, details the salient steps involved between one or more client devices (e.g., client device 104/106 of FIG. 1 and 204/304, 206/306 of FIGS. 2 and 3, respectively) and a feedback plugin (e.g., feedback plugin 214/314, 226/326 of FIGS. 2 and 3, respectively). Before carrying out receiving step 502, process 500 preferably includes a step of subscribing to an electronic content (e.g., predefined website, predefined web mail or predefined application window) that is capable of being accessed on the client device. In this step, the feedback plugin may perform a variety of functions depending on the type of electronic content present or active on the client device. The subscribing step performed in connection with process 500 is substantially similar to the one discussed in relation to process 400 of FIG. 4. Moreover all variations and different embodiments described with respect to process 400 of FIG. 4 equally apply to process 500 of FIG. 5. In other words, with respect to the web browser embodiments, the utilizing step (i.e., utilizing a built-in API of the web browser to provide information relating to potential mention of one or more individuals), the accepting step (i.e., accepting the notification from the client device to transform the feedback plugin from a non-activated state to an activated state of operation) and the monitoring step (i.e., monitoring changes in the web site) discussed in connection with process 400 of FIG. 4 also apply to process 500 of FIG. 5. Similarly, with respect to the application window embodiments, the utilizing step (i.e., utilizing Accessibility API of the operating system to provide information relating to potential mention of one or more individuals), the accepting step and the monitoring step (both of which are substantially similar to those described in the web site embodiments) discussed in connection with process 400 of FIG. 4 also apply to process 500 of FIG. 5. Different implementations of the monitoring step described in connection with process 400 of FIG. 4 also apply to process 500 of FIG. 5.

In the context of an applications window, the above-mentioned monitoring step includes detecting, using the feedback plugin, one or more monitoring signals generated from the relevant applications to infer contextual information that may be informative regarding identity of one or more individuals. The present teachings recognize many ways to monitor applications. By way of example, monitoring one or more applications includes monitoring a signal produced by such application(s) and the signal is not supported or not documented by the electronic content provider or application vendor. In one scenario of this example, a software vendor may not support the signal that the software produces. In another scenario of this example, an application vendor (e.g., Microsoft) and/or electronic content provider (e.g., Google providing Gmail or Yahoo providing Yahoo mail or an internal company electronic mail system) may not support the signal produced by the application (which may be an electronic mail application).

In certain aspects of the present teachings, receiving step 502 of FIG. 5, is not initiated when a user highlights hypertext, text or a portion of a web page. In one implementation of the present teachings, displaying and/or causing to display step 512 does not present a user interface and/or a panel to gather feedback regarding one or more products, their features and attributes. Further, in another implementation of the present teachings, displaying and/or causing to display step 512 does not present a user interface and/or a panel to gather feedback regarding business entities and their quality of operation and service.

The present teachings recognize various ways of implementing conveying step 508 of FIG. 5. In accordance with one embodiment of the present teachings, this step includes conveying the information (about the potential mention relating to one or more of the individuals) through a request from the feedback plugin to the feedback server to resolve the information relating to potential mention of one or more of the individuals. In other words, the feedback server is requested to determine whether the information conveyed identifies any individuals. The feedback plugin's request is chosen from a group comprising network request, web request and feedback plugin request. A network request may use one or more types of networks for conveying the feedback plugin's request. A web request may use a specific communication protocol (e.g., HTTP protocol) for conveying the feedback plugin's request. The feedback plugin request may use certain instructions programmed into the feedback plugin for conveying the request.

Figure 6:
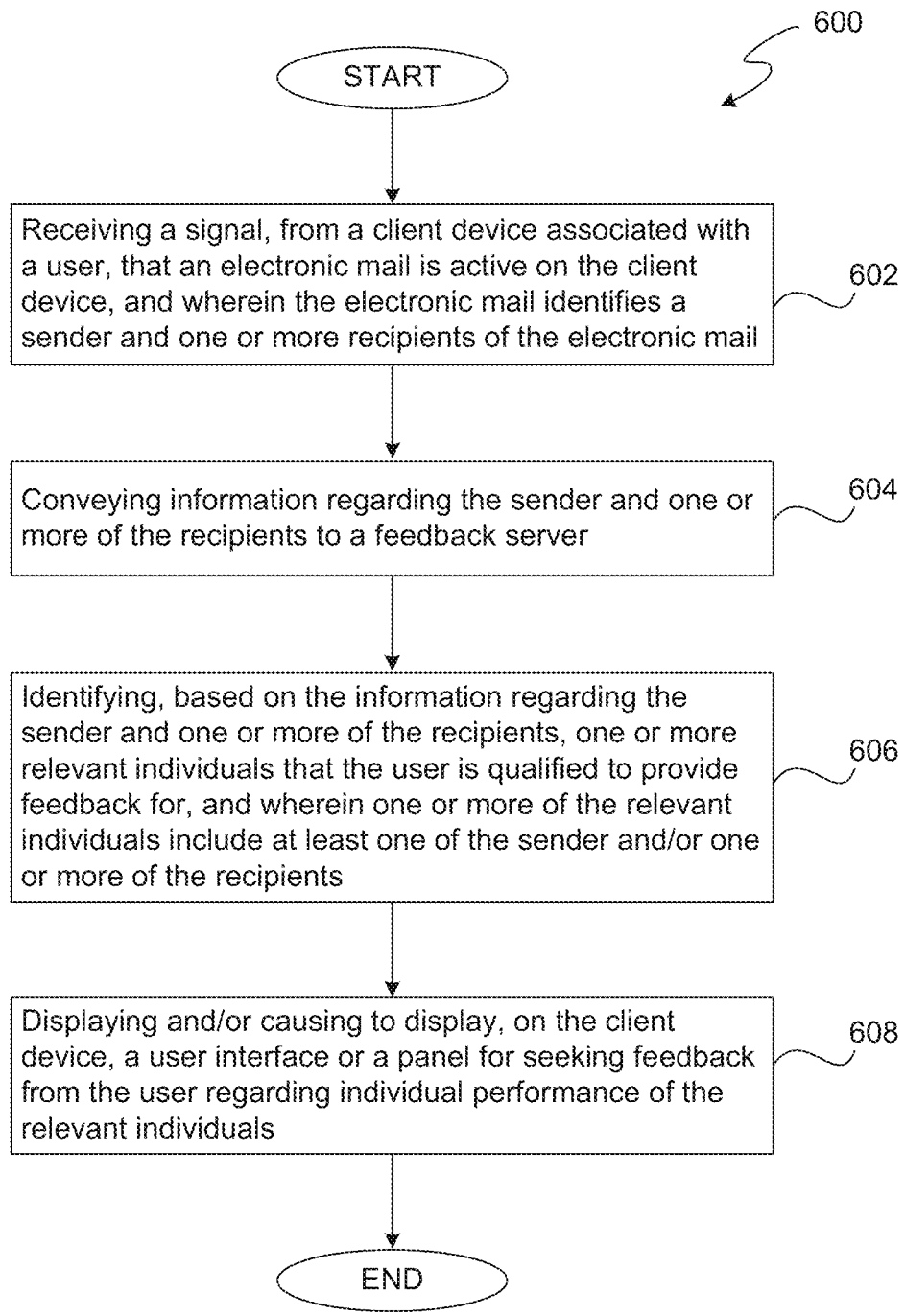
FIG. 6 shows a process flow diagram for a method, according to yet another embodiment of the present teachings, for seeking feedback for individuals that are mentioned in a specified electronic content.

FIG. 6 shows another feedback seeking process 600, according to yet another alternate embodiment of the present teachings and that may be used to obtain, among other things, feedback on individual performance. Feedback seeking process may begin with a step 602, which includes receiving a signal that an electronic mail is active on a client device. The electronic mail identifies a sender and one or more recipients of the electronic mail. Furthermore, the signal is received when the electronic mail is or was active on the client device, which is associated with a user.

Next, a step 604 includes conveying information regarding the sender and one or more of the recipients to a feedback server.

After step 604 has concluded, then a step 606 is carried out. This step includes identifying, based on the information regarding the sender and one or more of the recipients mentioned in conveying step 604, one or more relevant individuals that the user is qualified to provide feedback for. In this step, one or more of the relevant individuals include at least one of the sender and/or one or more of the recipients.

Process 600 may conclude with step 608, which includes displaying and/or causing to display, on the client device, a user interface or a panel for seeking feedback from the user regarding individual performance of the relevant individuals.

Process 600 may include a subscribing step that is substantially similar to that described in connection with process 400 and 500. Moreover all variations and different embodiments described with respect to process 400 of FIG. 4 and process 500 of FIG. 5 may well be applied during implementation of process 600 of FIG. 6. In other words, with respect to the web browser embodiments, the utilizing step (i.e., utilizing a built-in API of the web browser to provide information relating to potential mention of one or more individuals), the accepting step and the monitoring step discussed in connection with process 400 of FIG. 4 and process 500 of FIG. 5 may well apply to process 600 of FIG. 6. Similarly, with respect to the application window embodiments, the utilizing step (i.e., utilizing Accessibility API of the operating system to provide information relating to potential mention of one or more individuals), the accepting step and the monitoring step discussed in connection with process 400 of FIG. 4 and process 500 of FIG. 5 may apply when implementing process 600 of FIG. 6. Different implementations of the monitoring step described in connection with process 400 of FIG. 4 and process 500 of FIG. 5 may also apply to process 600 of FIG. 6.

In one embodiment of the present teachings, the user is one of the recipients of the electronic mail. According to one aspect, receiving step 602 of the present teachings includes accepting, from the client, a request for information regarding the sender and/or one or more of the recipient associated with the electronic mail. As shown in FIG. 3, the client device may have installed thereon a mail client and feedback plugin, and in this configuration, receiving step 602 includes the mail client conveys the signal to the feedback plugin, which is communicatively coupled to the feedback server. The feedback plugin interacts with the feedback server when the electronic mail is active on the client device (e.g., an act by the user or by the mail client that displays the electronic mail on the client device).

When a user interface and/or a panel is displayed, according to processes 400, 500, 600 of FIGS. 4, 5 and 6, respectively, or a combination thereof, then an additional transmitting step may be performed. In this step, feedback of the user regarding at least one of the relevant individuals is transmitted to another user. In one aspect of the present teachings, another user is one of the relevant individual or is different from the each of the relevant individuals.

The present teachings also offer preferred feedback seeking processes, which represent a combination feedback seeking process 400 of FIG. 4 and feedback seeking process 500 of FIG. 5. One implementation of such preferred methods begins with a receiving step that include receiving a notification at a feedback plugin that a specified electronic content is active on a client device that is associated with a user. During this receiving step, the feedback plugin is communicatively coupled to the client device.

Next, a retrieving step is performed. This step includes retrieving, using the feedback plugin and in response to the above-mentioned receiving step, at least a portion of the specified electronic content from the client device into the feedback plugin.

Then, an analyzing step is carried out by the feedback plugin. Specifically, at least the portion of the specified electronic content is analyzed to identify information relating to potential mention of one or more individuals in the specified electronic content. In one aspect, the analyzing step of the present teachings is carried out when the specified electronic content is active on the client device.

In some instances, the portion of the specified electronic content retrieved into the feedback plugin contains information that does not contribute to determining the identity of any individual, then in these instances, the analyzing step may include filtering out such extraneous information to arrive at information relating to potential mention of one or more individuals.

In certain embodiments of the present teachings, the analyzing step may consider the following types of information extraneous and therefore, not include such information in its analysis: (1) user interaction with content and/or a product; or (2) presence of one or more business entities or an individual's name associated with an area. It is noteworthy that at the end of the analyzing step, the information relating to potential mention of one or more individuals does not necessarily include the identity of any individual.

After the analyzing step has concluded, the preferred feedback seeking process then proceeds to a conveying step, which includes conveying the information relating to potential mention of one or more of the individuals from the feedback plugin to a feedback server to gain insight into the information relating to potential mention of one or more of the individuals in the specified content.

The feedback server, in the preferred embodiments of the present teachings, advances an identifying step, which includes identifying one or more relevant individuals based on the information relating to potential mention of one or more of the individuals (obtained from the analyzing step).

The feedback server next performs a collecting step. This includes collecting additional information about one or more of the relevant individuals to generate a user profile for each of one or more of the relevant individuals. As will be explained later that a user interface and/or a panel is presented on the client device and that the user interface and/or the panel is constructed using the user profile information.

Referring back to the above-mentioned preferred feedback seeking process, upon conclusion of the collecting step, a transmitting step is carried out. In this step, the feedback server transmits to the feedback plugin, the user profile about at least some of the relevant individuals that the user is qualified to provide feedback for. The user profile provided by the feedback server, in the transmitting step, is preferably more informative about one or more of the relevant individuals than the information relating to potential mention of one or more of the individuals (obtained from the analyzing step).

The preferred feedback seeking process may come to an end with a displaying and/or a causing to display step. In this step, the feedback server and/or the feedback plugin display and/or cause to display a user interface and/or a panel for obtaining feedback on at least some of the relevant individuals. The user interface and/or the panel is displayed and/or caused to be displayed on or adjacent to the electronic content on the client device. In this embodiment of the present teachings, the user interface and/or the panel are constructed using the user profile. Furthermore, in the displaying and/or the causing to display step, the web server provides the specified electronic content and the feedback server and/or the feedback plugin provide the user interface and/or the panel. In this configuration, the feedback server is different from the web server.

The above-described feedback seeking processes (e.g., feedback seeking processes 400, 500, 600 and combinations thereof) are not limited to only seeking feedback, but also extends to assigning tasks to relevant individuals, conveying a "to-do list" to relevant individuals, sharing an agenda between the user and one or more relevant individuals and managing goals of the user and/or one or more of the relevant individuals and/or teams. As a result, feedback seeking process be thought of as a task assigning process, a list conveying process, an agenda sharing process or a goal management process that does not necessarily provide feedback. Furthermore, regardless of the process implemented to display and/or cause to display the user interface and/or the panel, the user inputs at least one of feedback, task list, "to-do list," agenda and goals in the user interface and/or panel and such input is received by the client device. In one preferred embodiment of the present teachings, the user inputs is ultimately stored at the feedback server so that it may be later retrieved for further review by the user or others.

The present arrangements also provide a system for interacting with a client device. The system includes: (1) a feedback server containing instructions for seeking feedback and/or information relating to work deliverables to the client device; (2) a network serving as a communication interface between the feedback server and a feedback plugin; and (3) the feedback plugin is located on the client device and receives information and/or signals from a mail client and/or a website to process information about one or more individuals.

In this system, the information relating to work deliverables may include information to facilitate assigning tasks to individuals, information conveying a "to-do list," information to facilitate sharing an agenda between two or more users and information to facilitate managing goals of teams and/or individuals. The mail client receives electronic mail from an electronic mail server and/or an electronic mail web server.

FIGS. 8 and 9 shows a table, according to one embodiment of the present invention and that presents exemplar code to implement certain salient functions of the feedback plugin and the feedback server, respectively.

FIG. 8 describes different functions 900, according to one embodiment of the present teachings, of a feedback plugin. After the feedback plugin is installed on a client device, a step 901 includes subscribing, using a feedback plugin, to be notified when an Internet web browser, installed on the client device, visits one or more predefined web pages. In other words, in this subscribing step, the feedback plugin and the web browser are configured such that when the web browser visits one or more predefined webpages, the web browser notifies the feedback plugin of the web browser's visit.

By way of example, if a Chrome browser extension plugins ("Chrome") are used in conjunction with a feedback plugin, then subscribing under step 901 includes parsing a manifested file. This step is, preferably, carried out when the manifested file is installed on the feedback plugin. The term "manifested file," refers to a specific file that specifies the feedback plugin's capabilities and usage. The phrase "parsing a manifested file," as used herein, conveys that a web browser is processing (e.g., opening and reading) the manifested file. In the Chrome example, the manifested file of a particular plugin informs certain websites, which are deemed relevant, the level of interest they have garnered from the public at large. In response to receipt of the subscription from the feedback plug in, the web browser grants the subscription, e.g., Chrome informs the feedback plugin that the feedback plugin will be informed when the Chrome visits the predefined websites or websites specified in the manifested file of the feedback plugin.

In step 902 of FIG. 9, when the web browser visits the predefined websites or websites specified in the manifested file of the feedback plugin, then the feedback plugin is placed from an inactive state to an active state. In the embodiment of the present teachings when Chrome is implemented as a web browser, the feedback plugin transforms from an inactive state to an active state when the client device visits the predefined websites that are present or listed in the list of manifested files of the feedback plugin.

In another embodiment of the present teachings, step 902 includes monitoring DOM changes to see if they match an attribute selector, e.g., EMAIL_SELECTOR, and if they do, then such matching DOM mutation events (also known as "DOM changes") transform the feedback plugin from an inactive state to an active state. FIG. 8 shows exemplar code in Javascript and/or jQuery that enables this function of EMAIL SELECTOR that transforms the feedback plugin from an inactive state to an active state. The code that enables this function resides in the feedback-plugin and may specify a certain pattern. By way of example, the code specifies a Cascading Style Sheets ("CSS") selector. CSS selector describes how HTML elements are to be displayed on a computer screen, printed on paper, or presented in other media. Further, the CSS selector specifies a pattern where a hierarchy of HTML elements exists.

In yet another embodiment of the present teachings, the feedback plugin is transformed from an inactive state to an active state by a predefined or specific animation event. Several animation-related events are available through the DOM event system. DOM events are generated at the start and end of each animation and at the end of each iteration of an animation.

A step 903 of FIG. 8 includes monitoring DOM changes to determine if there is a place to display the feedback plugin's user interface. The phrase "feedback plugin's user interface," as used herein, refers to a user interface developed by the feedback plugin, using information present at feedback server, and advanced to the client device. By way of example, in Gmail, the feedback plugin's user interface is displayed in the Gmail sidebar. Generally, however, feedback plugin's user interface is displayed on and or adjacent to electronic content, e.g., web pages or an email interface. In one aspect of this example, if a sidebar element, e.g., a contact list or some other information, is presented on the client device, then in step 903, the feedback plugin determines if there is enough space in the sidebar element to replace with its own user interface. The feedback plugin (in its active state) may listen or monitor for the presence of a sidebar element on the client device and configures its user interface such that it replaces the sidebar element.

After the completion of step 903, FIG. 8 shows that a step 904 is carried out. Step 904 includes displaying and/or causing to display, using the feedback plugin, a user interface and/or a panel for obtaining feedback on at least some of the relevant individuals. Preferably, the user interface and/or the panel is constructed using the user profile which may be stored on the feedback server or on a database associated with the feedback server. In one embodiment of the present teachings, an entire boundary that encompasses electronic content of interest, such as email messages or a particular email message is visually presented, for example, in or adjacent to the electronic content or email interface. If a sidebar element is present then, the entire boundary that encompasses electronic content of interest may replace the previous contact of the sidebar element.

In another embodiment of step 904, when the feedback plugin detects the presence of a new electronic content or new email message on the client device, then feedback plugin proceeds to override the previous contents of the sidebar element, i.e., the old user profiles of the previously deemed relevant individuals, is overridden in favor of the new information, e.g., recent user profiles, i.e., user profiles of individuals deemed relevant in light of recently uploaded email message or electronic content.

In accordance with one embodiment of the present teachings, before step 904 of FIG. 8 is carried out, the feedback plugin performs an analyzing step as described in step 905 of FIG. 8. According to the analyzing step, the feedback plugin analyzes potential mention of one or more individuals in active electronic content, e.g., active email, on the client device.

In a subsequent step, step 906, the feedback plugin conveys a list of potential mentions to a web server, e.g., a feedback server, and based upon a response from the web server, displays the results on the client device. By way of example, the feedback plugin displays the results obtained from the web server as a webpage in an iframe. The iframe conveys or presents the user profiles of individuals deemed relevant in light of recently uploaded email message or electronic content. In one embodiment of the present teachings, in step 906, the feedback plugin manipulates the sidebar in an email interface, e.g., Gmail interface or application, to include user profiles of individuals deemed relevant in light of recently uploaded email message or electronic content. The feedback plugin may manipulate the rectangle that includes a web page or a frame, which includes all contents of email messages.

FIG. 9 shows different steps carried out by a feedback server. Step 1001 of FIG. 9 involves registering an endpoint (i.e., a point of connection for the feedback server and external devices, such as a client device that has a feedback plugin installed thereon) in the feedback plugin that is responsive to information conveyed from the feedback plugin. The registered endpoint is catalogued on both sides. When the feedback plugin requests feedback server to identify relevant individuals from information relating to potential mention of individuals or requests for more information regarding mention of one or more relevant individuals from the feedback server, the feedback server receives that request for more information at the registered endpoint in the feedback server. In this scenario, the feedback server makes the endpoint available so that it may receive the request for information. On the feedback plugin, the endpoint is also registered such that the feedback plugin has a location to where the request for more information is sent.

Next, step 1002 of FIG. 9 includes accepting web requests from the feedback plugin. In reference to the above-mentioned example, a request for identifying relevant individuals from information relating to potential mention of individuals or request for more information regarding mention of one or more relevant individuals is sent to the feedback server as a web request, and the feedback server, in return, is configured to accept the feedback plugin's request in the form of a web request.

Then, step 1003 of FIG. 9 includes parsing or breaking down, using the feedback server, mentions of one or more potential names of individuals obtained from the feedback plugin. This parsing or breaking down step is used to prepare a URL of an iframe that is conveyed back to the feedback plugin so that the iframe is ultimately presented on the client device preferably alongside the electronic content (e.g., email) of interest. By way of example, an email message that mentions one or more potential names of individuals, also presents information related to those individuals alongside the email message.

Although illustrative embodiments of this invention have been shown and described, other modifications, changes, and substitutions are intended. Accordingly, it is appropriate that the appended claims be construed broadly, and in a manner consistent with the scope of the disclosure, as set forth in the following claims.

What is claimed is:

1. A method of seeking feedback, said method comprising:
   subscribing, using a feedback plugin, to be notified when a web browser visits one or more predefined web pages;
   receiving a notification at a feedback plugin that said web browser has visited or is visiting one or more said predefined web pages on a client device, which is associated with a user, wherein said feedback plugin is communicatively coupled to said client device;
   transforming said feedback plugin from a non-active state to an active state;
   retrieving, using said feedback plugin and in response to said receiving of said notification, at least a portion of one or more said predefined web pages from said client device into said feedback plugin;

analyzing, using said feedback plugin, at least said portion of one or more said predefined web pages to identify information relating to potential mention of one or more individuals in one or more said predefined web pages;

conveying said information relating to potential mention of one or more of said individuals from said feedback plugin to a feedback server to gain insight into whether said information relating to potential mention of one or more of said individuals in one or more of said predefined web pages is related to one or more relevant individuals, wherein one or more of said relevant individuals are those that said user is qualified to provide feedback for;

accepting from said feedback server a user profile for one or more of said relevant individuals;

displaying and/or causing to display, using said feedback server and/or said feedback plugin and on or adjacent to one or more of said predefined web pages on said client device; said user interface and/or a panel for obtaining feedback on at least some of said relevant individuals, wherein said user interface and/or said panel is constructed using said user profile, wherein in said displaying and/or said causing to display, said web server provides said one or more said predefined web pages and said feedback server and/or said feedback plugin provides said user interface and/or said panel, and wherein said feedback server is different from said web server; and wherein said receiving said notification at said feedback plugin includes: monitoring, using said feedback plugin, for receipt of a document object model ("DOM") mutation event notification from said client device when structure of a DOM associated with the predefined website undergoes a change; and receiving, at said feedback plugin, said DOM mutation event notification from said client device.

2. The method of seeking feedback of claim 1, further comprising receiving, at said feedback plugin, a grant of subscription from said web browser, wherein said subscribing includes parsing a manifested file on said feedback plugin, and said manifested file includes a list of one or more predefined web pages, and wherein said receiving includes receiving notification when said web browser visits one or more of said predefined web pages listed in said manifested file.

3. The method of seeking feedback of claim 1, wherein said monitoring includes monitoring DOM mutation events to identify a condition when said DOM mutation event matches a predefined attribute selector, and wherein said transforming includes transforming said feedback plugin from said inactive state to an active state when said DOM mutation event matches said predefined attribute selector.

4. The method of seeking feedback of claim 3, wherein said predefined attribute selector is a cascading style selector.

5. The method of seeking feedback of claim 3, wherein said DOM mutation event is generated at beginning, end or reiteration of an animation event.

6. The method of seeking feedback of claim 3, wherein said displaying and/or said causing to display includes determining, using said feedback plugin, whether enough space is present, at said client device, to replace a sidebar element in an email interface or place a user interface in or adjacent to one or more of said predefined web pages.

7. The method of seeking feedback of claim 1, wherein said displaying and/or said causing to display includes replacing a sidebar element in an email interface with an entire boundary that encompasses electronic content of interest, at least some of which is obtained from said feedback server.

8. The method of seeking feedback of claim 1, wherein said displaying and/or said causing to display includes replacing a sidebar element in an email interface with one or more user profiles of individuals deemed relevant in light of recently uploaded email message or electronic content at said feedback plugin.

9. The method of seeking feedback of claim 8, wherein said displaying and/or said causing to display includes displaying and/or causing to display said user interface as a webpage in an iframe, which includes said user profile.

10. A method of seeking feedback, said method comprising:

subscribing, using a feedback plugin, to be notified when a web browser visits one or more predefined web pages;

receiving a notification at a feedback plugin that said web browser has visited or is visiting one or more said predefined web pages on a client device, which is associated with a user, wherein said feedback plugin is communicatively coupled to said client device;

transforming said feedback plugin from a non-active state to an active state, retrieving, using said feedback plugin and in response to said receiving of said notification, at least a portion of one or more said predefined web pages from said client device into said feedback plugin;

analyzing, using said feedback plugin, at least said portion of one or more said predefined web pages to identify information relating to potential mention of one or more individuals in one or more said predefined web pages;

conveying said information relating to potential mention of one or more of said individuals from said feedback plugin to a feedback server to gain insight into whether said information relating to potential mention of one or more of said individuals in one or more of said predefined web pages is related to one or more relevant individuals, wherein one or more of said relevant individuals are those that said user is qualified to provide feedback for;

accepting from said feedback server a user profile for one or more of said relevant individuals;

displaying and/or causing to display, using said feedback server and/or said feedback plugin and on or adjacent to one or more of said predefined web pages on said client device, said user interface and/or a panel for obtaining feedback on at least some of said relevant individuals, wherein said user interface and/or said panel is constructed using said user profile, wherein in said displaying and/or said causing to display, said web server provides said one or more said predefined web pages and said feedback server and/or said feedback plugin provides said user interface and/or said panel, and wherein said feedback server is different from said web server; and wherein said displaying and/or said causing to display includes manipulating a sidebar element in an email interface to present a recent user profile, which is arrived by retrieving at least a portion of one or more of recent predefined web pages, wherein said recent predefined web pages are retrieved by said feedback plugin later in time than said predefine web pages, and wherein said recent predefined web pages include email messages or electronic content.

11. The method of seeking feedback of claim 10, wherein said manipulating said sidebar element in said email interface includes manipulating a rectangle that includes a web page or a frame, which includes content of email messages.

12. A method of seeking feedback, said method comprising:
   registering an end point of a feedback plugin in a connection between said feedback plugin and a feedback server;
   receiving, from said feedback plugin through said end point and at said feedback server, information relating to potential mention of one or more individuals to gain insight into whether identity of one or more of said individuals is present in an electronic content, wherein said information relating to potential mention of one or more of said individuals does not necessarily convey knowledge about one or more of said individuals, and wherein said electronic content is or was active on a client device, said feedback plugin is communicatively coupled to the client device associated with a user, and said feedback server is communicatively coupled to said feedback plugin through a network;
   identifying one or more relevant individuals, if information relating to identity of one or more of said individuals is present in said information relating to potential mention of one or more of said individuals obtained from said receiving and if one or more of said individuals are those that said feedback server determines said user to be qualified to provide feedback for;
   collecting, using said feedback server, additional information about one or more of said relevant individuals to generate a user profile for each of one or more of said relevant individuals;
   transmitting, from said feedback server to said feedback plugin, said user profile, wherein said user profile provided by said feedback server is more informative about one or more of said relevant individuals than said information relating to potential mention of one or more of said individuals that was received at said feedback server; and
   displaying and/or causing to display, using said feedback server and/or said feedback plugin and on or adjacent to said electronic content on said client device, a user interface and/or a panel for obtaining feedback on at least some of said relevant individuals, wherein said user interface and/or said panel is constructed using said user profile, wherein during said displaying and/or said causing to display, an electronic content provider provides said specified electronic content and said feedback server and/or said feedback plugin provide said user interface and/or said panel, and wherein said feedback server is different from said electronic content provider.

13. The method of seeking feedback of claim 12, wherein said information relating to potential mention of one or more of said individuals is in form of a web request and said feedback server is configured to accept said web request from said feedback plugin.

14. The method of seeking feedback of claim 12, wherein said identifying one or more of said relevant includes parsing or breaking down, using said feedback server, potential mentions of one or more of said individuals to prepare a URL of an iframe, and wherein said transmitting includes transmitting said URL of said iframe from said feedback server to said feedback plugin, and wherein said displaying and/or said causing to display, using said feedback server and/or said feedback plugin, includes displaying and/or causing to display said iframe on or adjacent to said electronic content on said client device.

* * * * *